United States Patent [19]

Lenker

[11] 4,274,309
[45] Jun. 23, 1981

[54] METHOD OF MANUFACTURE OF CERTAIN HAND WRENCHES AND THE LIKE

[76] Inventor: Paul E. Lenker, c/o Davenport Tool Company, 1132 E. LeClaire Rd., Eldridge, Iowa 52748

[21] Appl. No.: 123,669

[22] Filed: Feb. 22, 1980

[51] Int. Cl.³ .............................................. B21K 5/16
[52] U.S. Cl. ...................................... 76/114; 228/256; 29/175 A; 403/157; 81/60
[58] Field of Search ................. 76/114; 81/60, 61, 62, 81/63, 63.1, 63.2; 228/256; 29/175 A; 403/157, 159, 79

[56] References Cited

U.S. PATENT DOCUMENTS

| | | | |
|---|---|---|---|
| 1,307,485 | 6/1919 | Cunha | 81/61 |
| 1,524,935 | 2/1925 | Johnson | 29/175 A |
| 1,888,885 | 11/1932 | Pepperdine | 76/114 |
| 2,720,127 | 10/1955 | Bonniwell | 81/63 |
| 2,977,824 | 4/1961 | Rueb | 76/114 |

*Primary Examiner*—Nicholas P. Godici
*Assistant Examiner*—Roscoe V. Parker
*Attorney, Agent, or Firm*—Haven E. Simmons; James C. Nemmers

[57] ABSTRACT

A method of manufacturing hand wrenches having a relatively long handle attached at one end to a yoke pivotally carrying the housing of a ratcheting socket drive mechanism fabricates the yoke, instead of casting or forging it, and employs a separate ferrule at the joint between the handle and the yoke, the parts being held in assembled relation and rotated while during a two step operation weld metal is deposited between the ferrule and the yoke, the legs of the yoke at the same time being compressed upon the ratchet housing.

7 Claims, 4 Drawing Figures

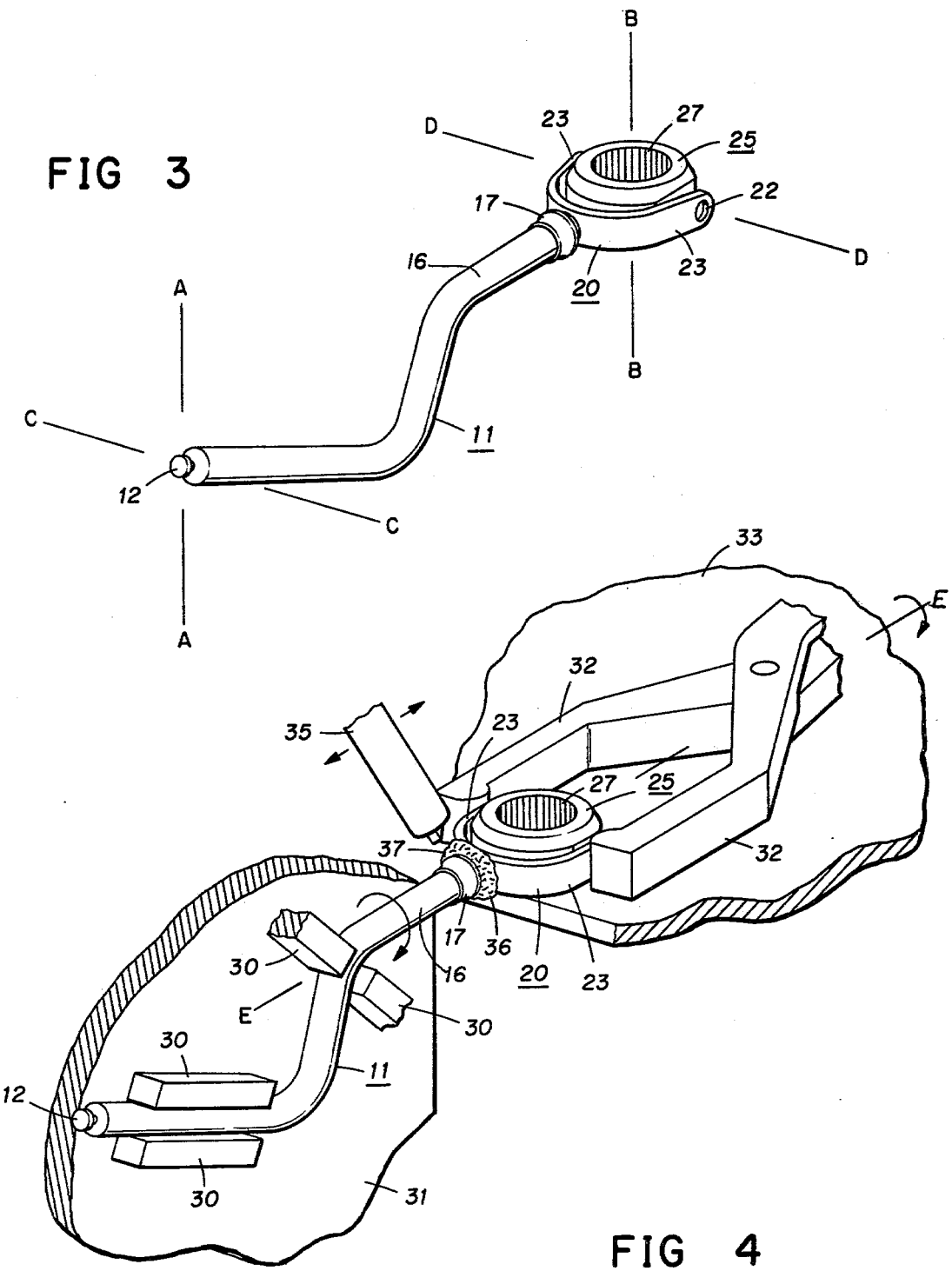

METHOD OF MANUFACTURE OF CERTAIN HAND WRENCHES AND THE LIKE

BACKGROUND OF THE INVENTION

The present invention concerns the manufacture of certain types of metal hand tools, particularly those which consist of a handle with a yoke attached at one end for carrying a work performing assembly. More particularly, the invention is applied to a type of socket wrench having an elongated handle which is secured at one end to a separate yoke, the legs of the latter in turn having a ratcheting socket drive mechanism pivoted therebetween.

When the yoke is forged or cast and then machined, a suitable socket or the like for the handle can readily be incorporated in the neck of the yoke. But making the yoke in this manner is relatively expensive. A yoke which is fabricated from flat stock, on the other hand, is less expensive to produce in this respect but there then arises the problem of how to affix the handle to the yoke in a manner which provides adequate strength for the tool without inflating its cost. This is especially important when the handle is relatively long and thus the joint between it and the yoke subject to heavy stress during use. Hence the primary object of the invention is to lower the cost of such tools by fabricating the yoke and then attaching the same to the handle in a manner which assures a joint of adequate strength.

SUMMARY OF THE INVENTION

In its preferred form the invention incorporates a yoke fabricated by being punched from flat sheet or strap material and then bent to an initial shape. The legs of the yoke are next compressed upon a housing for the ratchet mechanism so that the trunnions of the latter are partially in place in journals formed in the legs of the yoke during the punching operation. A separate ferrule is slipped over the end of the handle to be joined to the yoke, the handle and ferrule then butted against the yoke and ratchet housing, and each clamped into position and rotated about the axis of the ferrule. During a two step operation a MIG (metal-inert-gas) welding gun or head in conjunction with a welding wire feeding system deposits metal between the abutting surfaces of the ferrule, the handle and the yoke as the parts rotate, preferably at non-uniform speed to deposit more metal at the two shoulders then at the two faces of the yoke, whereby a fillet weld is formed between the handle and the yoke. At the same time, taking advantage of the fact that the legs of the yoke are heated by the welding process, the clamp which grasps the yoke by its legs squeezes the legs down onto the ratchet housing to fully seat the trunnions of the latter in the journals of the yoke. The resulting assembly is then removed, air-cooled and subject to further finishing and assembly operations hereafter described in more detail.

BRIEF DESCRIPTION OF THE DRAWINGS

FIG. 3 illustrates the wrench handle, ferrule, yoke and ratchet housing positioned ready for the welding operation. FIG. 4 depicts the clamping of the parts shown in FIG. 3 and the welding operation.

DETAILED DESCRIPTION OF THE PREFERRED EMBODIMENT

Figure 1:
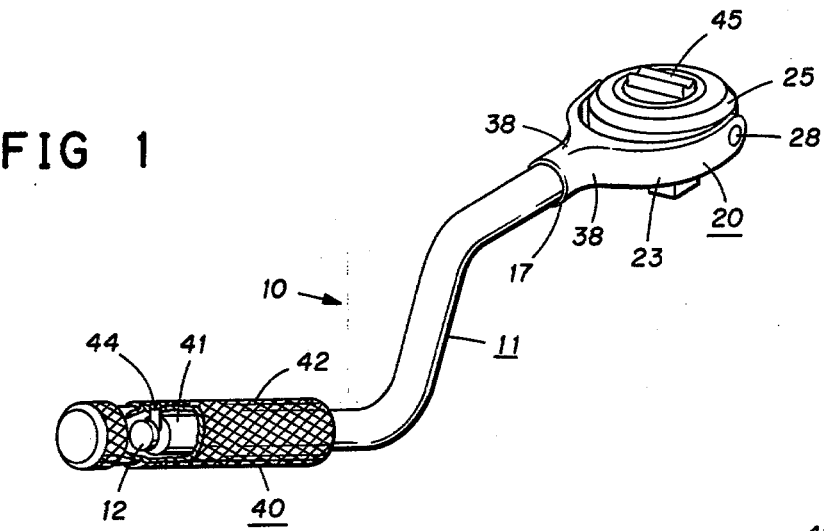
FIG. 1 illustrates a ratchet socket wrench of the type to which the invention is particularly directed shown in completed and finished form.
Figure 2:
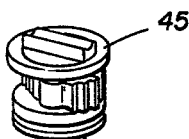
FIG. 2 is an exploded view of the wrench in FIG. 1 showing its separate parts.
Figure 2:
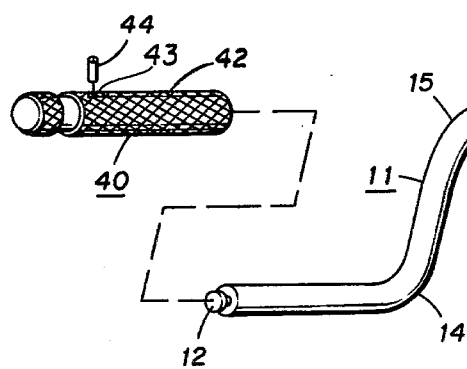

The completed ratchet wrench illustrated in FIG. 1, generally indicated at 10, is of the "speed" or "spinner" type, and consists of the parts shown in FIG. 2. The handle 11 is cut to lengths from bar stock, such as #1141 steel. Its rear end is necked and headed at 12 for purposes to be described and its forward end also necked to provide a locating dowel 13. Both the latter operations can be performed in an automatic screw machine or on a turret lathe. The handle 11 is bent to the shape illustrated in a punch press and die, the bend at 14 being to an angle of approximately 105 degrees and that at 15 to approximately 130 degrees, both bends 14 and 15 and the shank 16 lying in a common plane indicated by the lines A—A, B—B in FIG. 3. The ferrule 17 is formed as shown in FIG. 2 from a low-grade carbon steel in the same manner as the handle ends 12 and 13 and is a tight fit on the shank 16, tapering in diameter from its forward to its rear end. In a production version of the wrench 10 in which the diameter of the shank 16 is ½ inch, the ferrule 17 may have a diameter at its forward end of about ¾ inch and an overall length of about ⅞ inch, its forward end face being somewhat chamfered.

The yoke 20 is fabricated by punching it, together with a locating seat 21 for the dowel 13 and two journals 22 for the circular ratchet housing 25, from flat sheet or strip material, such as #1045 medium carbon steel. Then it is bent partially to shape in a forming die and punch press to provide a pair of legs 23. The housing 25 is also made from a medium grade hardenable carbon steel in an automatic screw machine in which the housing 25 is centrally bored and reamed, chamfered at both its opposite end faces 26 (only one being shown), and then cut off the stock. The ratchet splines 27 are next broached around the interior housing wall, and a pair of opposite, axially aligned trunnions 28 (only one being shown) simultaneously formed by a trepanning operation. The handle 11, yoke 20 and housing 25 are then hardened by heat treating.

The ferrule 17 is slipped over the handle shank 16 adjacent the dowel 13, a pair of wave washers 29 are placed over the housing trunnions 28, the housing 25 placed between the yoke legs 23, and the latter further bent in a vise such that the housing trunnions 28 only partially and loosely engage their journals 22, whereby the housing 25 is supported between the yoke legs 23. The handle 11 and ferrule 17 are then clamped, as indicated at 30 in FIG. 4, on a fixture plate 31. The yoke 20 and housing 25 are clamped between a pair of jaws, also as indicated at 32 in FIG. 4, on a second fixture plate 33 with the handle locating dowel 13 engaged in its seat 21 in the yoke 20 such that the plane indicated by the lines C—C, D—D in FIG. 3 through the axis of the shank 16, ferrule 17 and trunnions 28 lies at right angles to the plane A—A, B—B. The ferrule 17 is set back of the forward end of the shank 16 in order to leave a portion of the latter exposed. For instance, in the case of the dimensions previously given, the ferrule 17 is back about ⅛ of an inch from the adjacent end of the shank 16.

The fixture plates 31 and 33 are part of a welding machine which, as indicated in FIG. 4, rotates the two plates and the clamped parts about the axis of the handle shank 16 and ferrule 17 indicated by the line E—E in FIG. 4, the two plates 31 and 33 being driven by a common motor through a gear and sprocket train. The machine also mounts a MIG (metal-inert-gas) welding head, indicated at 35 in FIG. 4, adjacent the ferrule 17 and a welding wire feeding mechanism (not shown). During a first cycle of operation the plates 31 and 33 rotate twice at a rate of about eight seconds per revolution, the welding head 35 at the same time oscillating in directions parallel to the axis E—E as indicated in FIG. 4 and depositing metal between the ferrule 17 and the yoke 20 as well as on the exposed end of the shank 16. The foregoing operation, of course, greatly heats the yoke 20 and during the same an air actuated cylinder through a toggle linkage closes the clamp jaws 32 upon the yoke legs 23 and forces them and the wave washers 29 down upon the housing 25 to fully engage the journals 22 with the housing trunnions 28. The work is then removed from the machine and allowed to cool. Afterwards the work is reinstalled in the machine as aforesaid and a second cycle of operation begun, also consisting of two revolutions at the same rate as the first cycle. During the second cycle the welding head 35 remains stationary forward of the ferrule 17 in order to deposit more metal in that area, whereby the ferrule 17 becomes an integral part of the resulting fillet joint between the shank 16 and yoke 20. Furthermore, the speed of each revolution of the plates 31 and 33 during both cycles is non-uniform, slower when each of the two opposite shoulder areas 36 between the ferrule 17 and the yoke 20 pass the welding head 35 and faster when each of the two opposite face areas 37 between the two pass the head 35, so that more metal is deposited in the shoulder areas 36 where it is needed than in the face areas 37 at right angles to the former. The two cycles and the non-uniform rotation of the work are preferred because they help avoid overheating the work and the molten metal from running out of the joint.

The resulting assembly is then removed from the welding machine, air-cooled, and mounted on a grinding machine having a guide for the handle 11 and a splined power driven head which engages the housing splines 27 (after the housing 25 has been rotated 90° relative to the yoke 20). While being rotated, the work is moved laterally to a shaped grinding wheel and the fillet joint between the ferrule 17 and yoke 20 ground to the finished shape shown at 38 in FIG. 1. The work is removed from the grinding machine and the outer edges and faces of the yoke legs 23 are finish ground and radiused by hand on a grinding belt, after which the work is tumbled in a vibrating machine to smooth its edges and surfaces.

The spinner grip 40 (see FIGS. 1 and 2) is turned, bored at 41 axially from one end for a slip fit over the rear end of the handle 11, and knurled at 42 along its length in an automatic screw machine. Adjacent the inner end of the bore 41 the grip 40 is radially bored at 43 to receive a roll pin 44. All the parts are then chromium plated, and the grip 40 assembled on the handle 11 and retained by the roll pin 44 which engages the under side of the headed end 12 of the handle 11. Finally, the ratchet mechanism 45, which is a commercially available item, is inserted in the housing 25 and retained by a snap ring 46, as shown in FIG. 2. Other details of the manufacture of the wrench 10 will be apparent to those skilled in the art.

Fabricating the yoke 20, rather than casting or forging it, not only itself reduces its cost but also the amount and hence the cost of the finishing operations necessary for it. Likewise, the use of the ferrule 17 results not only in a stronger joint between the handle 11 and the fabricated yoke 20 but also reduces the amount of weld metal, and thus further reduces the cost of the wrench 10. This role of the ferrule 17 is particularly important where the handle is relatively long compared with the yoke 20, as is typical of the type of wrench concerned, and thus the joint between the two subject to large stresses during use. In addition, the ferrule 17 also helps prevent the molten metal from flowing out of the desired area before solidifying. If, on the other hand, the handle is relatively short compared with the yoke, i.e., a "stub handle" where the wrench is designed for work in confined areas, the ferrule 17 may be omitted. The weld in that case may still be advantageously formed in the same manner as when the ferrule 17 is present and will provide adequate strength for the joint in view of the much reduced stresses imposed upon it by the short handle. Contributing also to economy of cost and time in either case is use of the heat of the weld to "set" the yoke legs 23 in their final position about the housing 25 and at the same time to relieve stresses in the yoke 20 resulting from its previous bending while cold, first in the forming die and punch press and then the vise, both as recounted above.

Though the present invention has been described in terms of a particular embodiment, it is not limited to that embodiment alone. Instead, the following claims are to be read as emcompassing all adaptations and modifications of the invention falling within its spirit and scope.

I claim:

1. In the manufacture of hand tools, each including an extending operating handle and a generally U-shaped yoke for carrying the housing of a work performing assembly adapted for pivoting about a first axis between the legs of the yoke, said axis being defined by a pair of axially aligned trunnions extending from opposite locations on the assembly housing and a corresponding pair of axially aligned trunnion journals in the yoke legs adjacent the ends thereof, one end of the handle adjoining the exterior of the yoke intermediate its legs such that the yoke and a longitudinal portion of the handle adjacent said end thereof are symmetrically disposed with respect to a pair of planes normal to each other, the first axis lying in one of said planes, whereby said handle end and the yoke legs form a pair of opposite shoulder areas and a pair of opposite face areas therebetween, the shoulder areas being disposed at right angles relative to the face areas with respect to a second axis defined by the intersection of said planes, an improved method of manufacturing said tools comprising: fabricating the yoke including said journals by punching from sheet or strap material and then partially bending to shape; positioning the assembly housing between the yoke legs with their respective trunnions and journals in axial alignment with each other; holding the handle, the yoke and the assembly housing in their aforesaid positions relative to each other while rotating the same about said second axis; and adding material in and adjacent said shoulder and face areas by welding means disposed adjacent thereto as said areas pass the welding means during said rotation while compressing the yoke legs upon the assembly housing to fully engage the housing trunnions in their journals.

2. The method of claim 1 wherein said positioning of the assembly housing between the yoke legs includes further bending of the yoke effective to support the housing between the yoke legs by partial engagement of the housing trunnions in their respective journals.

3. The method of claim 2 wherein said handle and yoke revolve as aforesaid during at least two revolutions during which the welding means oscillates longitudinally of said handle portion adjacent the yoke.

4. The method of claim 3 including cooling the handle and the yoke after completion of said revolutions, and thereafter again rotating the handle and the yoke as aforesaid during at least two additional revolutions and adding additional material by the welding means during said additional revolutions, the welding means remaining stationary closely adjacent the yoke legs during said additional revolutions.

5. The method of claim 4 wherein the speed of rotation of each of said revolutions of the handle and the yoke is non-uniform, being more rapid as said face areas pass the welding means and more slowly as said shoulder areas pass the welding means.

6. The method of claim 1, 2, 3, 4 or 5 including positioning a ferrule on said handle portion before positioning the handle and the yoke relative to each other as aforesaid, the ferrule being disposed closely adjacent said handle end but with a longitudinal portion of said handle end exposed between the ferrule and the yoke, the welding means welding together the ferrule, said handle portion and the yoke during said rotation by adding material in said shoulder and face areas as aforesaid between the ferrule and the yoke.

7. The method of claim 6 including a yoke locating dowel formed integrally with and extending from said handle end and a handle locating seat in the yoke, said locating seat being punched in the yoke during said fabrication thereof, the locating portion and seat being axially aligned with said second axis and engaged with each other when the handle and the yoke are positioned relative to each other and rotated as aforesaid.

* * * * *